Aug. 15, 1944.  W. J. PARKS  2,355,891
SCREENING APPARATUS
Filed Sept. 10, 1941   2 Sheets-Sheet 1
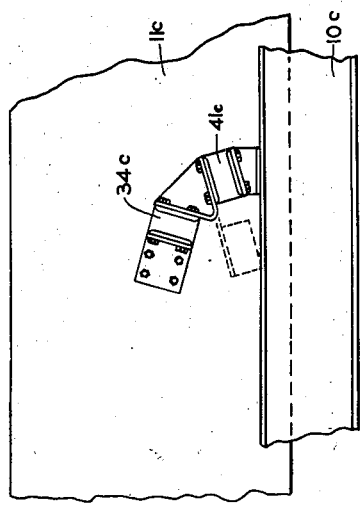
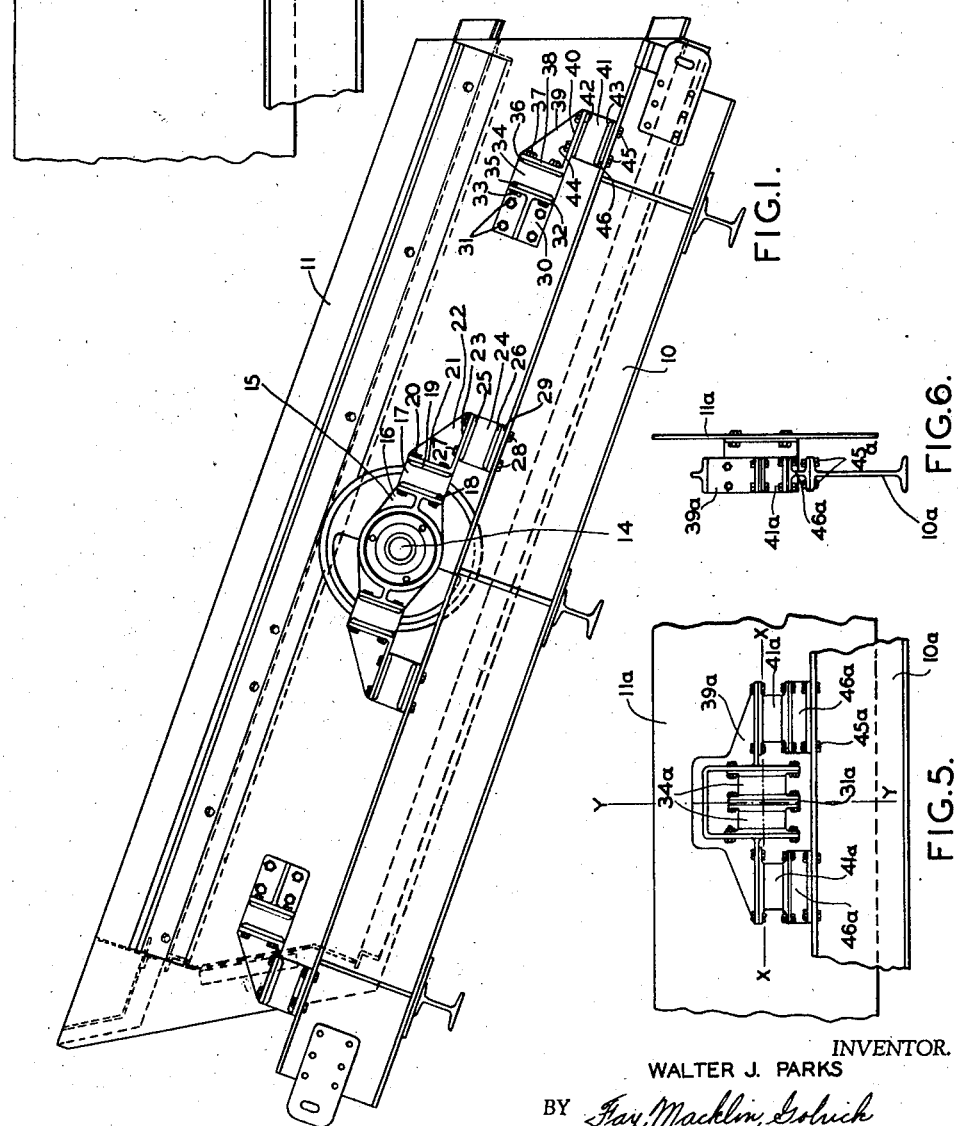
INVENTOR.
WALTER J. PARKS
BY
ATTORNEYS.

Aug. 15, 1944.  W. J. PARKS  2,355,891
SCREENING APPARATUS
Filed Sept. 10, 1941  2 Sheets-Sheet 2

INVENTOR.
WALTER J. PARKS.
BY
ATTORNEYS.

Patented Aug. 15, 1944

2,355,891

UNITED STATES PATENT OFFICE 2,355,891

SCREENING APPARATUS

Walter J. Parks, Shaker Heights, Ohio

Application September 10, 1941, Serial No. 410,282

11 Claims. (Cl. 209—326)

This invention relates, as indicated, to screening apparatus, but has reference more particularly to new and improved types of resilient supports for supporting and stabilizing screen bodies having a circular or elliptical movement in a vertical plane.

In my United States Letters Patents Nos. 2,066,362 and 2,208,596, gyratory screen bodies are illustrated having resilient supports in the form of rubber bushings or blocks, which are designed to accommodate the circular or elliptical movements of the screen bodies by a universal displacement of the rubber in a given plane. This requirement is accomplished by making the resilient supports of approximately the same stiffness for all directions of displacements in the given plane.

This is particularly evident in the drawings of Patent No. 2,208,596, wherein a circular shear type rubber block is mounted in such a manner that the displacement of the rubber occurs between the faces of the metal plates (7 and 8 in Fig. 5) to which the rubber is vulcanized and the faces of which are disposed in planes parallel to the plane of movement of the screen body. It is further evident that if such a rubber unit were to be mounted with the faces of the plates disposed in planes perpendicular to the plane of movement of the screen body, the stiffness of the unit would be much greater in one direction of displacement than in the other. As a matter of fact, the stiffness of the unit in compression between the plates would be so great, for the ordinary thickness of rubber used in such shear units and for the required displacement of the screen body in that direction, that the rubber would rapidly deteriorate and the resulting movement of the screen body in that direction would be effectively constrained in certain types of screens as compared with the movement in a direction parallel with the plates of the rubber unit.

The present invention has as its primary object the provision of resilient mountings for screen bodies having a circular or elliptical movement in a vertical plane, which mountings not only overcome the aforesaid objections and disadvantages, but at the same time are characterized by the compactness resulting from the arrangement of the end plates at right angles to the plane of movement of the screen body.

A further object of the invention is the provision of mountings of the aforesaid character in pairs of units with the steel faces thereof disposed in planes perpendicular, or approximately perpendicular, to the plane of movement of the screen body, such that one of the units of each pair accommodates by shear displacement the movement of the screen body in one direction and the other unit of the pair accommodates the displacements of the screen body at right angles to the first displacement.

To the accomplishment of the foregoing and related ends, said invention, then, consists of the elements hereinafter fully described and particularly pointed out in the claims; the annexed drawings and the following description setting forth in detail certain structure embodying the invention, such disclosed elements constituting, however, but one of various structural forms in which the principle of the invention may be used.

In said annexed drawings:

Fig. 1 is a side elevation of a screen embodying my invention;

Fig. 5 is a fragmentary side elevation of a modified form of mounting embodying the principal features of the invention;

Fig. 6 is an end elevation of the mounting shown in Fig. 5;

Fig. 9 is a fragmentary side elevation of still another modified form of mounting.

Figure 2:
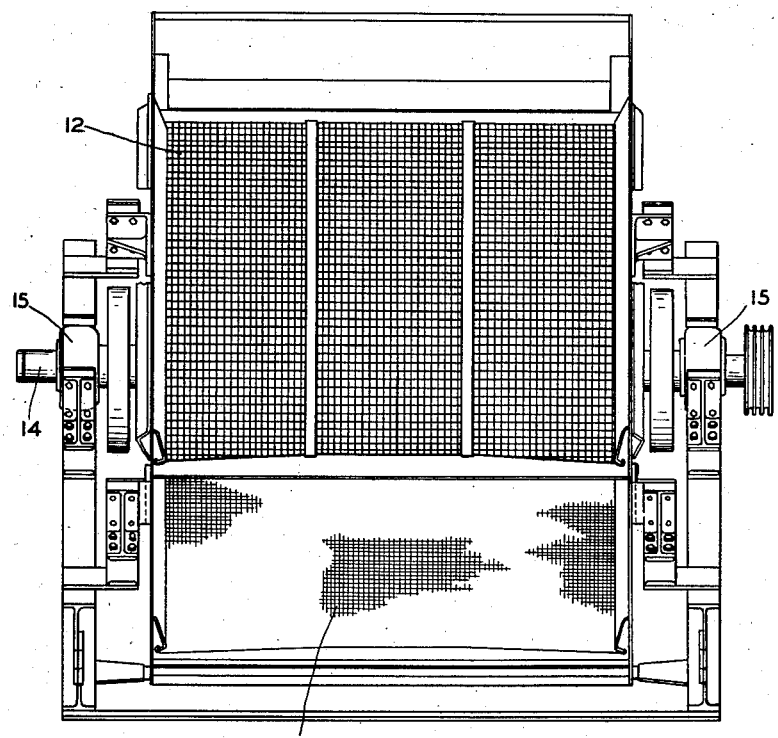
Fig. 2 is an end elevation of the screen.
Figure 3:
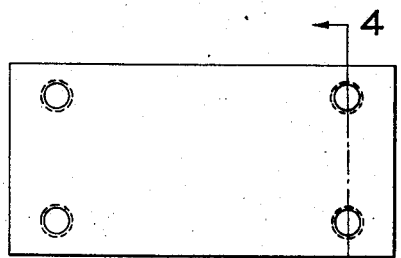
Fig. 3 is a side elevation of a typical shear type of rubber unit, adapted for use in the embodiment of the invention shown in Figs. 1 and 2.
Figure 4:
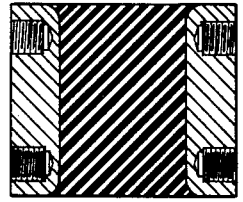
Fig. 4 is a cross-sectional view, taken on the line 4—4 of Fig. 3.

Referring more particularly to Figs. 1 to 4 of the drawings, there is illustrated a gyratory type of screening apparatus, similar to that shown and described in my Patent No. 2,066,362, and consisting essentially of a substantially stationary base or supporting frame 10, and a screen body or frame 11 which is resiliently mounted on the base 10 and to which a gyratory movement is imparted for screening the materials delivered thereto. The screen body, in this case, is provided with two screen decks 12 and 13, but may have any number of such decks.

The screen body is balanced or supported for gyratory movement midway of its ends on a transverse driving shaft 14, which passes through the side walls of said body and which is supported at its opposite ends in a free floating fashion in companion gyratory supporting bodies 15 similar in function to the bodies 19 in my Patent No. 2,066,362. The screen body is adapted to be gyrated in the same manner as is the screen body in my aforesaid patent, to which reference may be made for a description thereof.

The gyratory supporting bodies 15, in the present case, are resiliently supported on the stationary base 10 in the following manner. Each of the bodies 15 has secured to the ends thereof, as by means of bolts 16, a shear type of rubber unit, preferably of rectangular cross-section, and consisting of a block of rubber 17 and metal plates 18 and 19 secured, as by vulcanization, to opposite faces thereof and disposed in planes substantially perpendicular to the plane of movement of the screen body 11. The plates 19 are secured, as by means of bolts 20 to the plates 21 of rigid metallic members 22. The members 22 have flanges 23 which are substantially at right angles to the flanges 21 and interposed between the latter and the base 10 are rubber units similar to the aforesaid units, and consisting of a block of rubber 24 and metal plates 25 and 26 secured, as by vulcanization, to opposite faces thereof and disposed in planes substantially perpendicular to the plane of movement of the screen body 11 as well as substantially perpendicular to the planes in which the plates 18 and 19 are disposed. The plates 25 are secured to the flanges 23 by means of bolts 27, and the plates 26 are secured as by means of bolts 28, to metal pads 29 which are interposed between the plates 26 and the base 10 of the machine.

It is to be understood, however, that the invention is not in any way restricted to any specific means of gyrating or oscillating the screen body, or to any specific method of mounting the drive shaft of the screen body. As a matter of fact, the drive shaft could be provided with an unbalanced weight, and gyration of the screen body obtained by merely rotating such drive-shaft. Moreover, the drive shaft need not be supported on the base frame, provided the screen body is supported on the base frame.

The screen body 11 is supported at or adjacent its ends on the base frame in the following manner.

Brackets 30 are rigidly attached, as by means of bolts 31, to the screen body 11 and are provided with flanges 32 which are disposed at right angles to the side plates of the screen body. Secured to these flanges, as by means of bolts 33, are shear rubber units, each consisting of a block of rubber 34 and metal plates 35 and 36 secured, as by vulcanization, to opposite faces thereof, the unit being preferably of rectangular cross-section. The plates 35 and 36 are likewise perpendicular to the side plate of the screen body, i. e., at right angles to the plane of movement of the screen body. The plates 36 are secured, as by means of bolts 37 to flanges 38 of intermediate rigid metallic members 39. The members 39 have flanges 40 which are substantially at right angles to the flanges 38, and interposed between the latter and the base 10 are rubber units similar to the aforesaid units, and consisting of a rubber block 41 and metal plates 42 and 43 secured, as by vulcanization to the opposite faces thereof. The plates 42 and 43 are disposed in planes substantially perpendicular to the plane of movement of the screen body as well as substantially perpendicular to the planes in which the plates 35 and 36 are disposed. The plates 42 are secured to the flanges 40 by means of bolts 44, and the plates 43 are secured, as by means of bolts 45, to metal pads 46 which are interposed between the plates 43 and the back 10 of the machine.

The aforesaid mounting for the ends of the screen body therefore has incorporated therein four units, each comprising two shear rubber elements having their metallic plates perpendicular to the plane of movement of the screen body and perpendicular to each other. This mounting functions in the following manner. Assuming a circular movement of the screen body in a vertical plane at right angles to the axis of the shaft 14, this circular movement may be considered as the resultant of two complementary movements at right angles to each other. This being true, the rubber units 34 will freely permit, by a displacement in shear, the rectilinear displacement of the screen body in a direction parallel with the plates 35 and 36, but will resist by virtue of the increased stiffness of the rubber the rectilinear displacements of the screen body in a direction perpendicular to these plates. These latter displacements will therefore displace the connecting members 39, which, in turn, cause a shear displacement in the units 41 in a direction parallel with their attaching plates 42 and 43, which direction is at right angles to the displacement caused in the units 34, and in this manner accommodating by movement in shear the rectilinear motion of the screen body which is complementary to the rectilinear motion accommodated by the units 34. Collectively, therefore, the units 34 and 41 will accommodate by shear displacements the circular movement of the screen body.

The construction of the screen body mounting units may be varied, using different arrangements of the elements 34, 39 and 41, as, for example, by assembling these elements as a unitary structure, as by molding them together in the manufacturing process, the only requirement in this connection being that the elements are relatively displaceable to accommodate the complementary movements which have been described.

The arrangement of parts shown in Figs. 1 and 2 is a simplified one adapted for light screens, but could be improved for use on heavier machines. The units are shown in a position wherein each unit carries an eccentric loading which could cause some tilting of the face plates of the shear rubber units with respect to each other. The amount of this tilting would, of course, be proportional to the load carried, the actual eccentricity of this load as governed by the design and also the thickness and stiffness of the rubber itself. To avoid this tilting, where necessary, the modified mountings illustrated in Figs. 5 to 8 inclusive may be employed. For convenience in reference the parts in these modified mountings which correspond with the parts in Figs. 1 and 2 are similarly numbered, but carry sub-letters to distinguish them from the latter.

Referring to Figs. 5 and 6, the shear rubber units 34a, which accommodate the rectilinear movement of the screen body 11a in the direction of the axis Y—Y, are secured to the screen body by means of the bracket 31a. The other ends of the rubber units 34a are connected to the intermediate member 39a which, in turn, is connected to the shear rubber units 41a which accommodate the rectilinear movement of the screen body along the axis X—X. The units 41a are in turn connected to the base frame 10a of the machine through the medium of the bolts 45a and members 46a.

With this arrangement, it is seen that the vertical load, along axis Y—Y, transmitted from the screen body to the member 39a is transmitted equally and centrally to the rubber units 34a, so that no tilting of the member 39a occurs. Similarly, the load transmitted by movements of the screen body in the direction of the axis X—X is similarly centered with respect to the face plates of the rubber units 41a, so that no tilting occurs from this source. This arrangement therefore eliminates any bending or tilting action of the members 39a with accompanying displacement of the rubber units.

Figure 7:
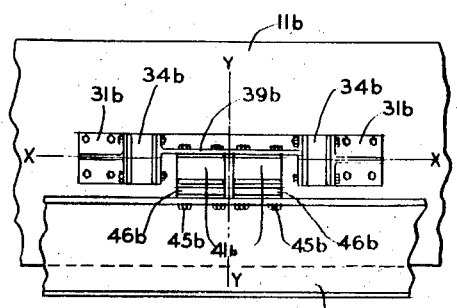
Fig. 7 is a fragmentary side elevation of another modified form of mounting.
Figure 8:
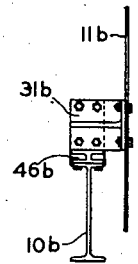
Fig. 8 is an end elevation of the mounting shown in Fig. 7.

Referring to Figs. 7 and 8, the shear rubber units 34b, which accommodate the rectilinear movement of the screen body 11b in the direction of the axis Y—Y, are secured to the screen body by means of the brackets 31b. The other ends of the rubber units 34b are connected to the intermediate member 39b, which, in turn, is connected to the shear rubber units 41b which accommodate the rectilinear movement of the screen body along the axis X—X. The units 41b are in turn connected to the base frame 10b of the machine through the medium of the bolts 45b and members 46b. It will be noted that in this arrangement, the parts are in reversed relationship to the parts in Figs. 5 and 6.

With the foregoing arrangement, it will be seen that the vertical load along axis Y—Y, transmitted from the screen body to the member 39b is transmitted equally and centrally to the rubber units 34b, so that no tilting of the member 39b occurs. Similarly, the load transmitted by movements of the screen body in the direction of the axis X—X is similarly centered with respect to the face plates of the rubber units 41b, so that no tilting occurs from this source. This arrangement therefore eliminates any bending or tilting action of the members 39b with accompanying displacement of the rubber units.

Referring to Fig. 9, this shows an alternative arrangement of the rubber units of Figs. 1 and 2, wherein the rubber units 34c and 41c are not disposed at right angles to each other, but are so arranged that the weight of the screen body 11c when imposed on the rubber units is partially carried by a secondary compression stress in the unit 34c, thereby increasing the strength of the bond between the rubber and steel end plates of the unit, it being desirable to avoid as much tension stress in this bond as possible.

It is thus seen that the various structures which have been described provide an efficient and practical arrangement of resilient supports for screening equipment and that the mounting not only overcome the various objections and disadvantages which have been referred to, but at the same time are characterized by the compactness resulting from the arrangement of the end plates at right angles to the plane of movement of the screen body.

Other forms may be employed embodying the features of my invention instead of the one herein explained, change being made in the form or construction, provided the elements stated by any of the following claims or the equivalent of such stated elements to be employed.

I therefore particularly point out and distinctly claim as my invention:

1. In a machine of the character described, a substantially stationary base, a screen body having a movement in a vertical plane which is the resultant of two complementary movements substantially at right angles to each other, and means for resiliently supporting said screen body on said base, said means comprising a plurality of resilient units, each unit comprising at least two resilient members of rubber or rubber like material, one of said resilient members being connected to said screen body and to the other of said resilient members, the other of said resilient members being connected to said base and to the first of said resilient members, one of said resilient members freely permitting throughout the elastic limit of said resilient member, by a displacement in shear, the rectilinear displacement of the screen body resulting from one of said movements but resisting movement of the screen body in a direction normal to the direction of said movement and the other of said resilient members freely permitting, throughout the elastic limit of said resilient member, by a displacement in shear, the rectilinear displacement of the screen body resulting from the other of said movements but resisting movement of the screen body in a direction normal to the direction of said movement.

2. In a machine of the character described, a substantially stationary base, a screen body having a movement in a vertical plane which may be considered as the resultant of two complementary movements substantially at right angles to each other, and means for resiliently supporting said screen body on said base, said means comprising a plurality of resilient units, each unit comprising at least two resilient members of rubber or rubber-like material, one of said resilient members being connected to said screen body and to the other of said resilient members, the other of said resilient members being connected to said base and to the first of said resilient members, one of said resilient members freely permitting throughout the elastic limit of said resilient member, the rectilinear displacement of the screen body resulting from one of said movements while resisting the rectilinear displacement of the screen body in a direction substantially perpendicular to said displacement, and the other of said resilient members freely permitting throughout the elastic limit of said resilient member, the rectilinear displacement of the screen body resulting from the other of said movements while resisting the rectilinear displacement of the screen body in a direction substantially normal to said last-named displacement.

3. In a machine of the character described, a susbtantially stationary base, a screen body having a movement in a vertical plane which includes at least two rectilinear movements which are susbtantially complementary to each other, and means for resiliently supporting said screen body on said base, said means comprising a plurality of resilient units, each unit comprising at least two resilient members of rubber or rubber-like material, one of said members being connected to said screen body and to the other of said resilient members, the other of said resilient members being connected to said base and to the first of said reilient members, one of said resilient members freely permitting throughout the elastic limit of said resilient member, by a displacement in shear one of said movements of the screen body while resisting by virtue of the greater stiffness thereof and movement of the screen body in a direction normal to the direction of said movement, and the other of said resilient members freely permitting throughout the elastic limit of said resilient member, by a displacement in shear, the other of said movements of the screen body while resisting by virtue of the greater stiffness thereof the movement of the screen body in a direction normal to the direction of the other of said movements.

4. In a machine of the character described, a substantially stationary base, a screen body having a movement in a vertical plane which includes movement in at least two directions which are complementary, and means for resiliently supporting said screen body on said base, said means comprising a plurality of units, each unit comprising at least two resilient members of rubber or rubber-like material, one of said members being connected to said screen body and to the other of said members, the other of said resilient members being connected to said base and to the first of said members, one of said members freely accommodating by movement in shear throughout the elastic limit of said resilient members, the movement of the screen body in one of said directions while accommodating less freely movement of the screen body in a direction substantially normal to said movement, and the other of said resilient members accommodating by movement in shear throughout the elastic limit of said resilient member, the movement of the screen body in the other of said directions while accommodating less freely movement of the screen body in a direction substantially normal to said last-named movement.

5. In a machine of the character described, a substantially stationary base, a screen body having a movement in a vertical plane which includes movements in at least two angularly related directions, and means for resiliently supporting said screen body on said base, said means comprising pairs of resilient members of rubber or rubber-like material, one member in each pair being connected to said screen body and to the other member of the pair and the other member of the pair being connected to said base and to the other member of the pair, one member in each pair freely permitting by a displacement in shear throughout the elastic limit of said resilient member, the movement of said screen body in one of said directions while resisting movement of the screen body in a direction normal to the direction of said movement, and the other member in each pair freely permitting by displacement in shear throughout the elastic limit of said resilient member, the movement of the screen body in the other of said directions while resisting movement of the screen body in a direction normal to said last-named direction.

6. A structure as defined in claim 5, in which the rubber members are disposed in planes substantially at right angles to the sides of the screen body.

7. A structure as defined in claim 5, in which the rubber members are disposed in planes substantially at right angles to the sides of the screen body and are also disposed in planes angularly related to each other.

8. A structure as defined in claim 5, in which the rubber members have metal plates permanently secured to opposite faces thereof and disposed in planes at substantially right angles to the sides of the screen body.

9. In a machine of the character described, a substantially stationary base, a screen body having a movement in a vertical plane which is the resultant of two complementary movements at right angles to each other, and a plurality of means for resiliently supporting said screen body on said base, each of said means comprising at least two steel plates connected respectively to the body and base, angularly related to each other and disposed in planes substantially perpendicular to the sides of the screen body, and a block of rubber-like material secured to at least one of said plates, said block freely permitting by displacement in shear throughout the elastic limit of said resilient member, the rectilinear displacement of the screen body resulting from one of said movements by resisting movement of the screen body in a direction normal to the direction of said movement.

10. A structure as defined in claim 5 in which one pair includes spaced resilient members carried by the body and the other pair includes a plurality of resilient members carried by the base with the resilient members carried by the base lying between the members carried by the body with the planes of displacement of each pair being at substantially right angles to the planes of displacement of the other pair.

11. A structure as defined in claim 5 in which one pair includes spaced resilient members carried by the base and the other pair includes a plurality of resilient members carried by the body with the resilient members carried by the body lying between the members carried by the base, with the planes of displacement of each pair being at substantially right angles to the planes of displacement of the other pair.

WALTER J. PARKS.